(12) United States Patent
Selvaraj et al.

(10) Patent No.: US 9,317,613 B2
(45) Date of Patent: Apr. 19, 2016

(54) LARGE SCALE ENTITY-SPECIFIC RESOURCE CLASSIFICATION

(75) Inventors: Sathiya K. Selvaraj, Cupertino, CA (US); Philip L. Bohannon, Cupertino, CA (US); Mridul Muralidharan, Bangalore (IN); Cong Yu, Hoboken, NJ (US); Ashwin Machanavajjhala, Millbrae, CA (US); Arun S. Iyer, Thane District (IN); Sundararajan Sellamanickam, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 892 days.

(21) Appl. No.: 12/764,694

(22) Filed: Apr. 21, 2010

(65) Prior Publication Data

US 2011/0264651 A1    Oct. 27, 2011

(51) Int. Cl.
    *G06F 17/30* (2006.01)

(52) U.S. Cl.
    CPC .............................. *G06F 17/30867* (2013.01)

(58) Field of Classification Search
    CPC ............................................... G06F 17/30867
    USPC ......................................... 707/707, 708, 709
    See application file for complete search history.

(56) References Cited

U.S. PATENT DOCUMENTS

| | | | | |
|---|---|---|---|---|
| 7,958,546 B2 * | 6/2011 | Kaplan | ................... | H04L 29/06 705/50 |
| 8,346,791 B1 * | 1/2013 | Shukla et al. | ................. | 707/759 |
| 8,583,921 B1 * | 11/2013 | Shu | ....................... | H04L 9/3247 713/168 |
| 2004/0205114 A1 * | 10/2004 | Kinoshita | ..................... | 709/202 |
| 2005/0222976 A1 * | 10/2005 | Pfleger | .............................. | 707/3 |
| 2006/0117003 A1 * | 6/2006 | Ortega et al. | ..................... | 707/4 |
| 2006/0161534 A1 * | 7/2006 | Carson et al. | ..................... | 707/3 |
| 2007/0005652 A1 * | 1/2007 | Choi et al. | ................. | 707/104.1 |
| 2007/0233671 A1 * | 10/2007 | Oztekin et al. | ..................... | 707/5 |
| 2008/0052262 A1 * | 2/2008 | Kosinov et al. | .................... | 707/1 |
| 2008/0243607 A1 * | 10/2008 | Rohan | ............... | G06Q 30/0273 705/14.69 |
| 2008/0319932 A1 * | 12/2008 | Yih et al. | ....................... | 706/20 |

(Continued)

OTHER PUBLICATIONS

Upstil, T. et al., "Exploiting Hyperlink Recommendation Evidence in Navigational Web Search", SIGIR '04, Sheffield, South Yorkshire, UK, ACM, (Jul. 25, 2004), 2 pages.

(Continued)

*Primary Examiner* — James Trujillo
*Assistant Examiner* — Fatima Mina
(74) *Attorney, Agent, or Firm* — Berkeley Law & Technology Group, LLP

(57) ABSTRACT

A system and method is described for large scale entity-specific classification of each entity-specific set of candidates in a collection of candidates for each specific entity in a collection of entities. The collection of entities may comprise a specific category or domain of entities (e.g. schools, restaurants, manufacturers, products, events, people). Candidates may comprise webpages or other resources with resource identifiers. Entity specific sets of candidates may be found by leveraging search engine query results and user interaction therewith for queries based on entity-specific attributes. The relationship(s) or class(es) for which candidate resources are being classified relative to a specific entity may comprise an authoritative, official home page (OHP), or other class (e.g. fan page, review, aggregator) relative to a specific entity. A feature generator generates entity-specific features for candidates. In accordance with its features, one or more classifiers rank each candidate for a specific class for a specific entity.

28 Claims, 5 Drawing Sheets

(56) References Cited

U.S. PATENT DOCUMENTS

2009/0119268 A1* 5/2009 Bandaru et al. ............... 707/3
2009/0157676 A1* 6/2009 Shanbhag ..................... 707/6
2009/0210419 A1* 8/2009 Chitnis et al. ................. 707/6
2013/0036005 A1* 2/2013 Rappe ...................... 705/14.48

OTHER PUBLICATIONS

Upstil, T. et al., "Query-independent Evidence in Home p. Finding", ACM Transactions on Information Systems (TOIS), (Jul. 2003), 24 pages.

Kraaij, W. et al., "The Importance of Prior Probabilities for Entry Page Search", SIGIR '02, Tampere, Finland, ACM, (Aug. 15, 2002), 8 pages.

Zhu, H. et al., "Navigating the Intranet with High Precision", WWW 2007, Banff, Alberta, Canada, (May 12, 2007), pp. 491-500.

Singhal, A. et al., "A Case Study in Web Search using TREC Algorithms", WWW10, Hong Kong, (May 15, 2001), 9 pages.

Hawking, D. et al., "Overview of the TREC-2001 Web Track", TREC, (May 9, 2002), 8 pages.

* cited by examiner

LARGE SCALE ENTITY-SPECIFIC RESOURCE CLASSIFICATION

BACKGROUND OF THE INVENTION

1. Field of the Invention

The present invention generally relates to resource classification. In particular, the present invention relates to techniques for automated entity-specific identification and classification of candidate resources.

2. Background

People often search for information on networks such as the Internet and the World Wide Web service available through it by querying general search engines, such as Yahoo! Search, or localized search engines, such as Yahoo! Local. Queries often request information about particular entities such as a particular school or business.

Real-world entities are often associated with computerized resources such as webpages accessible through the Internet. For a given entity, one or a few webpages identified by one or more uniform resource locaters (URLs) are deemed authoritative or official. For example, an official home page for an entity may be a webpage created by a school, a manufacturer, or an individual such as a professor, athlete, student or actor.

Presently, search engines are generally insufficient to routinely identify official home pages. Official home pages (OHPs) for entities are often not found or are buried in a long list of search results provided in response to user queries. There are several reasons for this. First, entities represented by webpages number in the hundreds of millions, which makes manual labeling of official home pages for those entities infeasible. Second, official home pages may not show up in top search results because they are often not optimized for search engines. Instead, third-party pages such as fan pages, aggregator sites, forums and other webpages are often presented to users as being more relevant to entities searched for than their official homepages because they are often optimized for search engines.

Instead of manually performing multiple searches and culling through results in search of an official home page, users would welcome an automated identification of official home pages for entities they are interested in. However, at least in this case, merely labeling webpages as official without identifying what they are official for isn't helpful. To be helpful, it must not only be determined whether a webpage is an official home page, but for what specific entity it is an official home page.

BRIEF SUMMARY OF THE INVENTION

A system and method is described for automated large-scale entity-specific identification and classification of a collection of candidate resources for a collection of entities. Classification may be for official home page (OHP) classification or other desired classification (e.g. fan page, official Facebook or Twitter page, aggregator page) of candidate resources relative to specific entities in the collection. Various trade and service marks, such as Facebook, Twitter and Yahoo!, are referred to herein merely to describe examples. A collection of entities for which entity-specific identification and classification of resources is desired may comprise a specific category, domain or logical type of entities having a real-world presence (e.g. schools, restaurants, doctors and clinics, manufacturers, products, events, and people such as actors and politicians). A collection of resources may comprise webpages, each having resource identifiers such as uniform resource identifiers (URIs). A large scale collection of entities may, for example, comprise hundreds of thousands of entities while a collection of candidate resources may, for example, number in the tens of billions.

In some embodiments, automated entity-specific identification and classification of resources may be seen as repeatedly finding the proverbial needle in a haystack of resources for each entity in a set of perhaps hundreds of thousands or millions of entities. However, entity-specific finding offers numerous advantages. Automated entity-specific identification and classification of resources may be leveraged to identify what specific entity a resource pertains to and the relationship of the resource to the entity. Entity-specific classification of resources may be leveraged, for example, in general and localized search results. Entity-specific classifications of resources may be used to identify the status of a particular resource relative to a specific entity. Entity-specific classifications may also be used to highlight resources that may not otherwise be highlighted due to, for example, a lack of search engine optimization.

In particular, embodiments of a method for automated entity specific identification and classification of resources are described herein. In one embodiment, a method comprises: (1) generating an aggregate set of candidates for an aggregate set of entities by generating, for each entity in the aggregate set of entities, an entity-specific set of candidates based on each entity's entity-specific attributes, wherein each candidate comprises a resource having a resource identifier; (2) pairing or otherwise associating each entity with each candidate in the entity's entity-specific set of candidates for entity-specific processing of candidates; (3) generating, for each entity-specific candidate, a candidate-specific set of features based on its candidate-specific attributes; and (4) generating an aggregate set of classifications for the aggregate set of candidates by generating, for each entity-specific candidate, an entity-specific classification based on its candidate-specific set of features, wherein candidates are classified as being one of in and out of a class.

A collection or aggregate set of entities may be obtained from a variety of sources, including Yahoo! Local. Each entity may have a structured set of attributes, e.g., name, street address, city/state/country address, area code, telephone number. If a list of entities is not categorized and the particular method is designed to operate on category-specific entities within the same category then such a list may be sorted or filtered into categories, domains or logical types of entities. The method may proceed with an aggregate set of category-specific entities selected from a particular category, domain or logical type of entity.

A first step of generating an aggregate set of candidates for the aggregate set of entities by generating, for each entity, an entity-specific set of candidates based on each entity's entity-specific attributes comprises, for example, for each entity in the set of entities: (a) generating at least one entity-specific representative query based on the entity's entity-specific attributes, (b) either or both (i) applying the at least one entity-specific representative query to a search engine and receiving the search results and (ii) receiving historical search results of a historical search engine query that is the same as or similar to the at least one entity-specific representative query and (c) selecting resources from the search results and/or historical search results as candidates in the entity's entity-specific set of candidates. The aggregate collection of entity-specific sets of candidates is referred to as an aggregate set or collection of candidates.

Representative queries may be generated using one or more combinations of a specific entity's attributes. For example, queries may comprise name queries, name-city queries, name-city-state queries, etc. These queries may be applied to a search engine to yield current search results and/or the queries may be used to find the same or similar queries in a historical database.

Selecting resources as candidates from the search results or historical search results may be based on a ranking of resources in such results. For example, the first 50 highest ranked results may be selected as candidates. Selecting resources from the historical search results as candidates may also be based on historical user click actions of the resources in historical search results. For example, the number of clicks by different users and/or the location of those users (e.g. as determined from their IP addresses) may be taken into account in selecting candidates. Further, the aggregate set of candidates may be increased or decreased, e.g., by adding resources found by link expansion analysis as candidates and/or removing undesirable resources from the aggregate set of candidates. Each entity-specific set of candidates within the aggregate set of candidates may generally include a variety of resources, most of which may not be the desired resource. For example, entity-specific sets of resources may comprise an OHP for the entity and non-OHPs such as parent pages, aggregator pages, news pages, blog pages, review pages, pages pertaining to other entities having one or more attributes similar to those of the desired entity. There may be some overlap of candidates among the many sets of entity-specific candidates.

A second step of associating each entity with each candidate in the entity's entity-specific set of candidates for entity-specific processing of candidates may comprise, for example, storing candidates in a table having columns identifying an entity and a column identifying a candidate. Thus each entry (row) associates or pairs entity-specific derived candidates with the specific entity. An entity identifier may be, for example, a Yahoo! Local entity identifier. A candidate identifier may comprise, for example, a candidate's resource identifier such as a URI or an identifier for information about a resource stored in a database.

A third step of generating, for each entity-specific candidate, a candidate-specific set of features based on its candidate-specific attributes comprises, for example, generating a category-candidate specific feature and an entity-candidate specific feature determined, respectively, by determining similarities of at least one of a candidate's candidate-specific attributes to at least one category attribute and to at least one entity-specific attribute.

Entity attributes may comprise, for example, an entity's name, street address, city/state/country address, area code, telephone number. Candidate attributes may comprise, for example, statistical data including user behavior towards the candidate, content data, resource identifier, etc. Statistical and content data may comprise, for example, the number of inlinks to the candidate, the number of domains inlinking to the candidate, candidate ranking in entity queries, the number of entities for which the candidate is in the top k queries, the number of entities for which the candidate's domain or host appears in the top k search results, position of the candidate in search results after removing aggregator domains, user selection data for the candidate when searching for its associated entity, content such as anchor text, title, headings, anchor text leading to the candidate, the candidate's resource identifier, where the content and resource identifier may be tokenized or mined for content to extract particular attributes. Category attributes may comprise, for example, attributes common to many entities in the category or an average or merger of or the top entity attributes and/or candidate attributes.

Some candidate attributes, such as statistical attributes, may also be used directly as features while other features may be generated using candidate attributes, e.g., using them in a comparison and using the result of the comparison as a feature. For example, candidate features may comprise category-candidate specific features and entity-candidate specific features determined, respectively, by determining similarities between candidate and category attributes and between candidate and entity attributes. These features may be used to determine whether candidates should be eliminated from consideration relative to a category of entities or a specific entity.

Features may be categorical, ordinal, continuous, etc. Features may be categorized, for example, as statistical, historical (e.g. ranking, click), search results, aggregator, type (category), content, location, matching, etc. Some statistical attributes used as features may be entity-independent, such as the number of inlinks and domains linking to a candidate. Statistical, historical and search features may overlap to some degree, comprising, for example, candidate ranking in current and historical search results for queries based on entity attributes, clicklog history involving statistics relating to who clicked on the candidate, how many times and for what query relative to total clicks on all search results. Aggregator features may comprise aggregator domains as well as features that may indicate aggregator resources such as the number of entities for which a resource is a candidate. Matching features may comprise an indication of how closely candidate attributes or features, such as a candidate's resource identifier string, title, headings, content, anchor text leading to the candidate and user behavior indicators, match entity attributes. Matching features may comprise several subcategories such as name match, phone match and location match.

Feature generation may be split and/or staged. For example, feature generation may be split into basic and advanced feature generation. Such split feature generation may avoid wasting valuable processing time generating features for specific entities when such entities don't even properly fall within the category of entities or otherwise lack basic features. Thus, for example, before generating the aggregate set of classifications, some embodiments may generate a reduced aggregate set of candidates by filtering the aggregate set of candidates, wherein subsequent processing such as, for example, additional feature generation and generation of an aggregate set of classifications are generated for the reduced aggregate set of candidates instead of the original aggregate set of candidates.

Thus, filtering is one example where split feature generation of basic and advanced features may be utilized so that a first portion of the candidate-specific set of features may be generated before the filtering and a second portion of the candidate-specific set of features may be generated after filtering. Filtering may reduce the number of candidates so that other features may be generated only for candidates remaining after the filtering step and before classification. Since both filtering and classifying seek to rule candidates in or out of a class for an entity, they may be referred to as filter classification and match classification. These different classifiers may variously classify candidates based on a comparison of candidate attributes to entity category attributes and/or entity-specific attributes. Like match classifiers, filter classifiers may comprise an algorithm such as a machine learning algorithm trained on positive and perhaps negative examples. Also like match classifiers, filter classifiers may comprise adjustable thresholds, which may be used to control the reduction of candidates.

Features may be generated, used and combined into feature vectors in different ways, e.g., linearly, non-linearly, to produce the most effective results during filter and match classification. For example, in one embodiment, optional filter classification may seek to eliminate: (a) candidates whose signature doesn't satisfactorily match a category signature (b) candidates that have too many similarities to aggregator resources such as yelp.com, citysearch.com, greatschools.net, publicschoolreview.com and bayareaschools.net; and (c) candidates having attributes indicating they are not in the proper location for the classification of the specific entity for which they are a candidate. Accordingly, prior to such filter stage(s), it may be useful to generate, combine and use only those features relevant to such filter stage(s) designed to eliminate irrelevant candidates while maintaining relevant candidates for subsequent matching classification.

A fourth step, generating an aggregate set of classifications for the aggregate set of candidates by generating, for each entity-specific candidate, an entity-specific classification based on its candidate-specific set of features, wherein candidates are classified as being one of in and out of a class comprises, for example, for each entity, scoring each entity-specific candidate and identifying as being in the class an entity-specific candidate having a high score or ranking. The aggregate collection of entity-specific classifications of candidates is referred to as an aggregate set or collection of classifications.

A minimum threshold may be set such that none or more candidates may be classified as being in the class depending on whether they are above a threshold score. As previously mentioned, a classifier may be split into filter and match classifiers. A classifier may also be a multi-stage classifier separated into staged classifiers where, for example, each specialized classifier focuses on a particular subtopic or purpose of classification such as location, type and name classification relative to a specific entity followed by aggregation of these staged classifiers for an overall filtering or match classification of a candidate relative to an entity. Staged classification may permit greater reusability of portions of or all of a classifier for different classes. As between different classes, features may be weighted differently and aggregate results may be assembled and processed differently to classify candidates for different classes relative to specific entities.

Classification predicts whether each entity-specific candidate is in or out of a class relative to a specific entity. A classifier implements logic that effectively defines a class, or a portion of it. Each classifier may comprise an algorithm such as a machine learning algorithm. Some embodiments may use, for example, gradient boosted decision tree (GBDT) and support vector machine (SVM) machine learning algorithms. For example, a classifier may comprise a supervised machine learning algorithm trained on a partial set of entity-specific classifications. Similarly, each classifier may comprise different types of supervised, semi-supervised and unsupervised machine learning algorithms. Learning algorithms may be trained using positive and also negative examples. Classifiers may utilize constraints where desirable, for example where a candidate should only be classified as being in a class for no more than one entity. Candidates are ranked by a classifier according to one or more of their features. A class may comprise an official home page or other relationship to an entity such as a fan, review or aggregator resource relative to the entity.

Candidates identified as being in a class (e.g. an OHP) relative to a specific entity may become part of the attributes for that specific entity. For example, for each entity for which a candidate was classified as being in the class, the candidate's resource identifier may be assigned to the entity's entity-specific attributes. As one example, Yahoo! Local may make a final identification of whether a candidate is in a class and may add the candidate's resource identifier as an attribute value of an entity. For example, a candidate's resource identifier may be entered as the value for an official home page attribute of an entity.

An embodiment of a system for automated large-scale entity-specific identification and classification of a collection of sets of entity-specific candidate resources for a collection of entities is also described herein. The foregoing summary of functionality of method embodiments applies equally well to system embodiments and, thus, will not be repeated.

In one embodiment, a system may comprise, for example, (1) a candidate generator configured to generate a collection of candidates for a collection of entities by generating, for each entity in the collection of entities, an entity-specific set of candidates based on each entity's entity-specific attributes; (2) a feature generator configured to generate, for each candidate in each entity-specific set of candidates, a candidate-specific set of features based on each candidate's candidate-specific attributes; and (3) a classifier configured to generate a collection of classifications for the collection of candidates by generating, for each candidate in each entity-specific set of candidates, an entity-specific classification based on the candidate-specific set of features, wherein candidates are classified as being one of in and out of a class.

A candidate generator is configured to generate a collection of candidates for a collection of entities by generating, for each entity in the collection of entities, an entity-specific set of candidates based on each entity's entity-specific attributes. In some embodiments, a candidate generator may comprise or interact with a query generator component that generates queries based on entity attributes, an entity source database component such as Yahoo! Local that stores source entities, an entity category selector or filter component that categorizes entities into categories and/or selects a category of entities, a search engine component that processes queries and returns search results, a historical database component that stores query logs, search result logs and/or click logs, and entity and candidate database components that store entities and their candidates.

A feature generator is configured to generate, for each candidate in each entity-specific set of candidates, a candidate-specific set of features based on each candidate's candidate-specific attributes. In some embodiments, a feature generator may comprise or interact with the candidate generator component, a candidate database component, a historical database component that stores query logs, search result logs and/or click logs, and entity and candidate database components that store entities and their candidates, a filter classifier component and a match classifier component.

In some embodiments, there may be a plurality of feature generators. For example, the feature generator may comprise a basic feature generator and an advanced feature generator. In some embodiments, one or more feature generators generate features at different times. For example, a basic feature generator may generate basic features for each candidate before a filter component filters out candidates, thereby creating a reduced set of candidates for which advanced features are generated. In some embodiments, the advanced feature generator generates, for each candidate in the entity-specific set of candidates, features based on similarities between the entity-specific attributes and the candidate-specific attributes. A feature generator may generate features for candidates, for example, directly from candidate attributes or by comparing candidate attributes to category attributes or entity attributes to determine similarities.

A classifier is configured to generate a collection of classifications for the collection of candidates by generating, for each candidate in each entity-specific set of candidates, an entity-specific classification based on the candidate-specific set of features, wherein candidates are classified as being one of in and out of a class. In some embodiments, a classifier may comprise or interact with the feature generator and databases storing features and classifications. One or more of the classifiers may be split and/or may be staged or specialized classifiers. In some embodiments, one or more classifiers are configurable to generate variable precision classifications. A classifier may comprise a machine learning algorithm. In some embodiments, a classifier may be trained on positive and/or negative examples of resource classifications.

In some embodiments, there may be a plurality of classifiers, e.g., a filter classifier and a match classifier. In some embodiments, a filter classifier is configured to generate, for each entity-specific set of candidates, an entity-specific reduced set of candidates, wherein the match classifier is configured to generate the collection of classifications for the collection of candidates by generating, for each candidate in each entity-specific reduced set of candidates, an entity-specific classification. In some embodiments, the filter classifier comprises a category filter configured to eliminate candidates based on dissimilarity between a category attribute and a basic feature of the candidates. In some embodiments, a match classifier classifies candidates based on their advanced features.

An embodiment of at least one manufacture is also described herein. At least one manufacture such as one or more computer readable mediums having computer executable instructions that, when executed by one or more computing machines, perform automated large-scale entity-specific identification and classification of a collection of sets of entity-specific candidate resources for a collection of entities. The foregoing summary of functionality of some method and system embodiments applies equally well to some manufacture embodiments and, thus, will not be repeated.

In one embodiment, one or more manufactures may have, for example, computer executable instructions that, when executed by one or more computing machines, perform the following steps: (1) accessing a collection of entities comprising entities having entity-specific attributes; (2) generating a collection of candidates for the collection of entities by generating, for each entity and its entity-specific attributes in the collection of entities, an entity-specific set of candidates based on the entity-specific attributes, wherein each candidate has candidate-specific attributes and wherein each candidate comprises a resource; (3) generating, for each candidate and its candidate-specific attributes in each entity-specific set of candidates, a candidate-specific set of features based on the candidate-specific attributes; and (4) generating a collection of classifications for the collection of candidates by generating, for each candidate and its candidate-specific set of features in each entity-specific set of candidate resources, an entity-specific classification based on the candidate-specific set of features, wherein candidates are classified as being one of in and out of a class.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
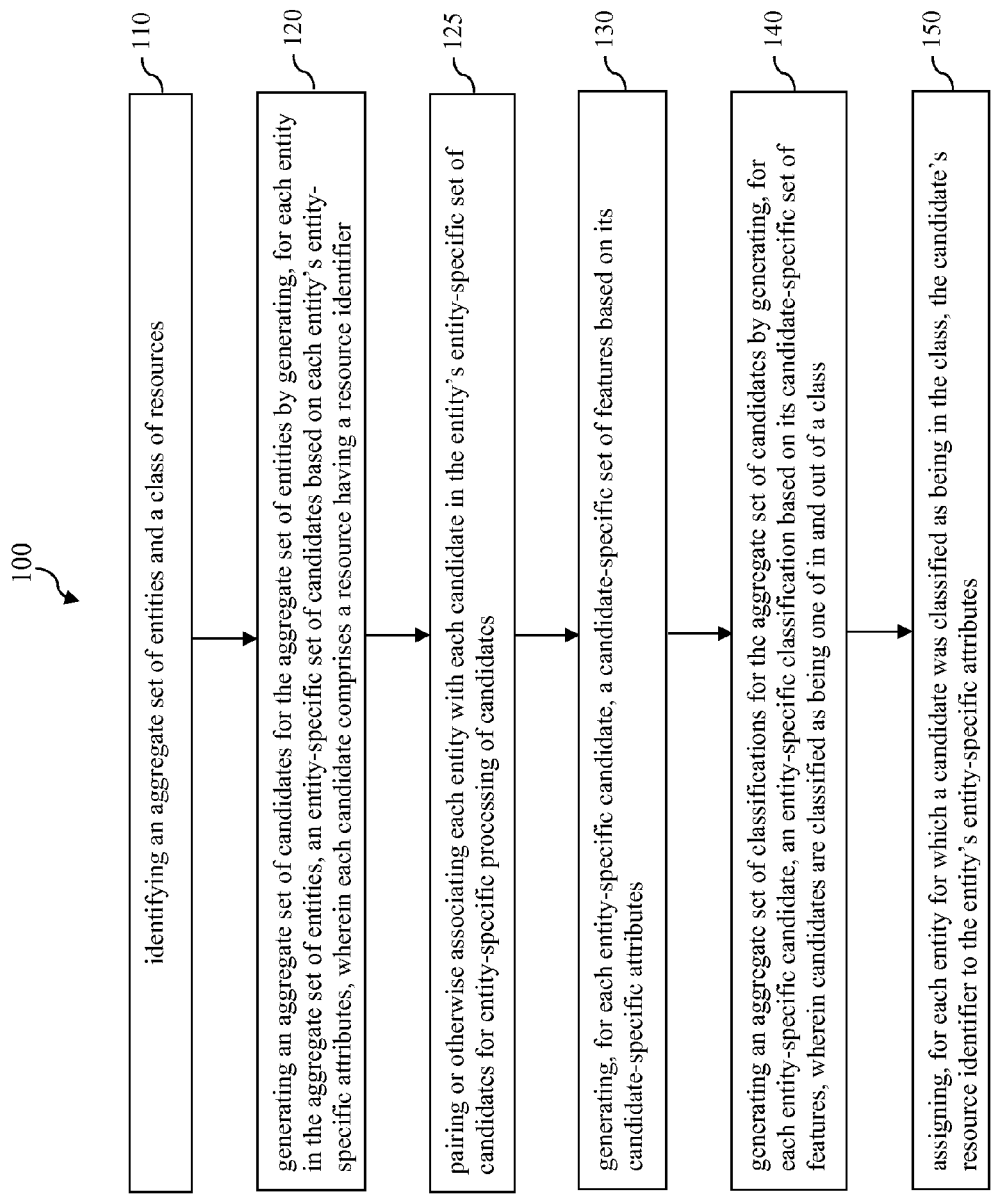
FIG. 1 is a flowchart of a method for generating an aggregate set of entity specific classifications for an aggregate set of entity-specific candidate resources in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number. Each drawing represents one of a plurality of embodiments of the invention. Each drawing represents a different embodiment, which is why each step and each element in each drawing is designated by a unique reference character.

DETAILED DESCRIPTION OF THE INVENTION

A. Introduction

A system and method is described for automated large-scale entity-specific identification and classification of a collection of candidate resources for a collection of entities. Classification may be for official home page (OHP) classification or other desired classification (e.g. fan page, review, aggregator) of candidate resources relative to specific entities in the collection. A collection of entities for which entity-specific identification and classification of resources is desired may comprise a specific category, domain or logical type of entities having a real-world presence (e.g. schools, restaurants, doctors and clinics, manufacturers, products, events, people such as athletes, entertainers, actors, politicians). A collection of resources may comprise webpages, each having resource identifiers such as uniform resource identifiers (URIs), which encompasses uniform resource locaters (URLs). A large scale collection of entities may, for example, comprise hundreds of thousands of entities while a collection of candidate resources may, for example, number in the tens of millions.

In some embodiments, automated entity-specific identification and classification of resources may be seen as repeatedly finding the proverbial needle in a haystack of resources for each entity in a set of perhaps hundreds of thousands or millions of entities. However, entity-specific finding offers numerous advantages. Automated entity-specific identification and classification of resources may be leveraged to identify what specific entity a resource pertains to and the relationship of the resource to the entity. Entity-specific classification of resources may be leveraged, for example, in general and localized search results. Entity-specific classifications of resources may be used to identify the status of a particular resource relative to a specific entity. Entity-specific classifications may also be used to highlight resources that may not otherwise be highlighted due to, for example, a lack of search engine optimization.

In order to provide a consistent discussion, it will be assumed in the following embodiments that the entity-specific class of resources is an OHP class. Formally, the OHP finding problem is defined as follows: given a set of entities $\{e_1, \ldots, e_n\}$, where each $e_i$ contains a set of attributes with values $(\{a^i_1: v^i_1, \ldots, a^i_k: v^i_k\})$, identify a set of candidate resources such as webpages $(\{r_1, \ldots, r_n\}$, such that each $r_i$ is either the OHP of $e_i$ or null if $e_i$ has no web presence.

Policies or criteria for determining what candidate resources are "official" or other qualifications for any given class may vary from one embodiment to the next. In some embodiments, a resource may be deemed official if it is created or maintained by the same person or entity that created or maintains the real-world entity. For example, a school home page created by the entity school itself is the OHP for the school. In other embodiments, if the organization/person behind the entity does not have an OHP for the entity, and the organization/person belongs to another higher level organization, then a resource created by the higher level organization for the entity is the OHP for the entity. For example, school home pages maintained by a school district instead of the schools themselves may be deemed OHPs for school entities. In some embodiments, any page maintained by a third-party for an entity is excluded from consideration as being an OHP for the entity. Of course such pages (e.g., Yelp review pages for restaurant entities) may themselves be in a different class and may also be helpful in the OHP finding problem.

B. Exemplary Method

In accordance with an embodiment of the present invention, FIG. 1 is a flowchart of a method 100 for generating an aggregate set of entity specific classifications for an aggregate set of entity-specific candidate resources applicable to entity-specific finding of any class. The method 100 illustrated in FIG. 1 comprises: step 110, identifying an aggregate set of entities and a class of resources; step 120, generating an aggregate set of candidates for the aggregate set of entities by generating, for each entity in the aggregate set of entities, an entity-specific set of candidates based on each entity's entity-specific attributes, wherein each candidate comprises a resource having a resource identifier; step 125, pairing or otherwise associating each entity with each candidate in the entity's entity-specific set of candidates for entity-specific processing of candidates; step 130, generating, for each entity-specific candidate, a candidate-specific set of features based on its candidate-specific attributes; step 140, generating an aggregate set of classifications for the aggregate set of candidates by generating, for each entity-specific candidate, an entity-specific classification based on its candidate-specific set of features, wherein candidates are classified as being one of in and out of a class; and step 150, assigning, for each entity for which a candidate was classified as being in the class, the candidate's resource identifier to the entity's entity-specific attributes.

Figure 2:
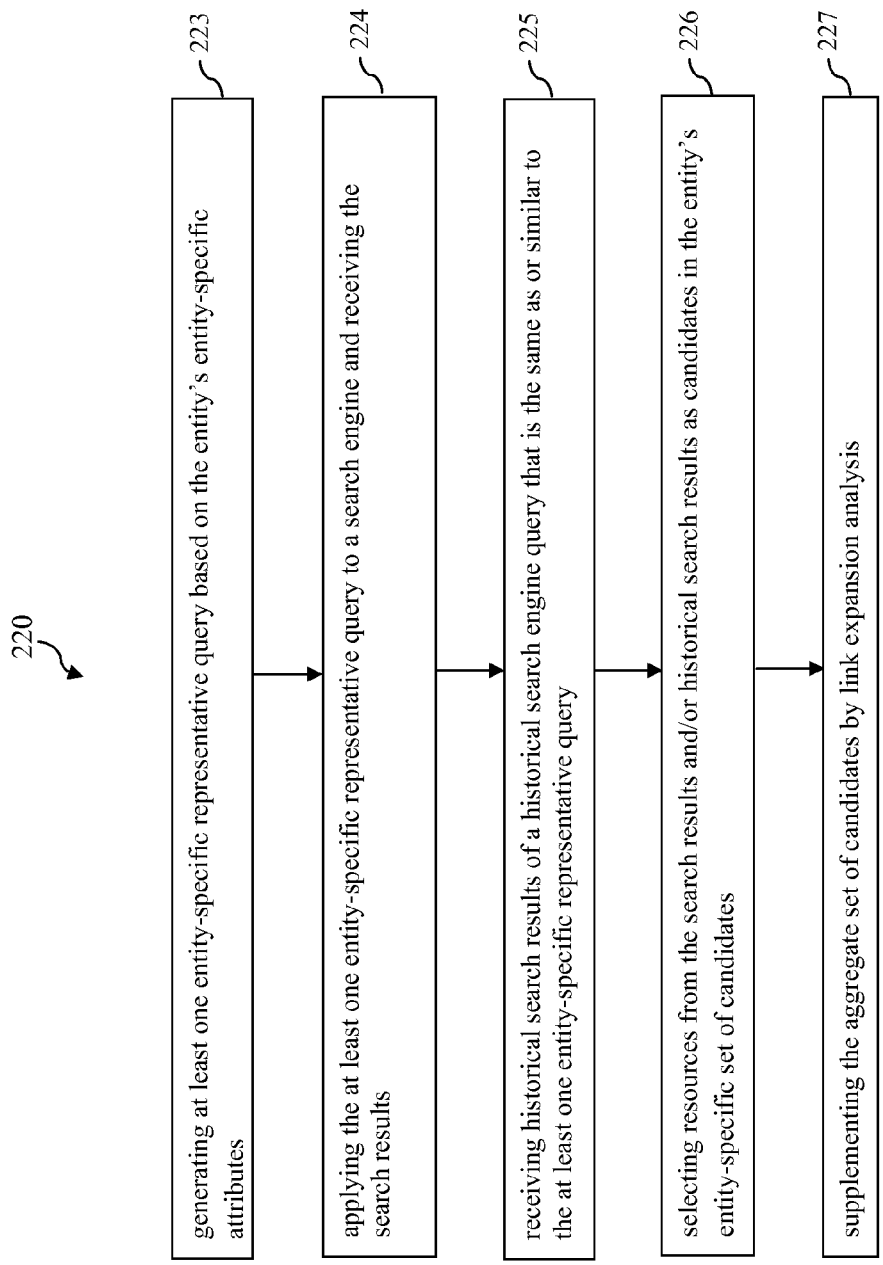
FIG. 2 is a flowchart of a method for generating an aggregate set of candidate resources for an aggregate set of entities in accordance with an embodiment of the present invention.
Figure 3:
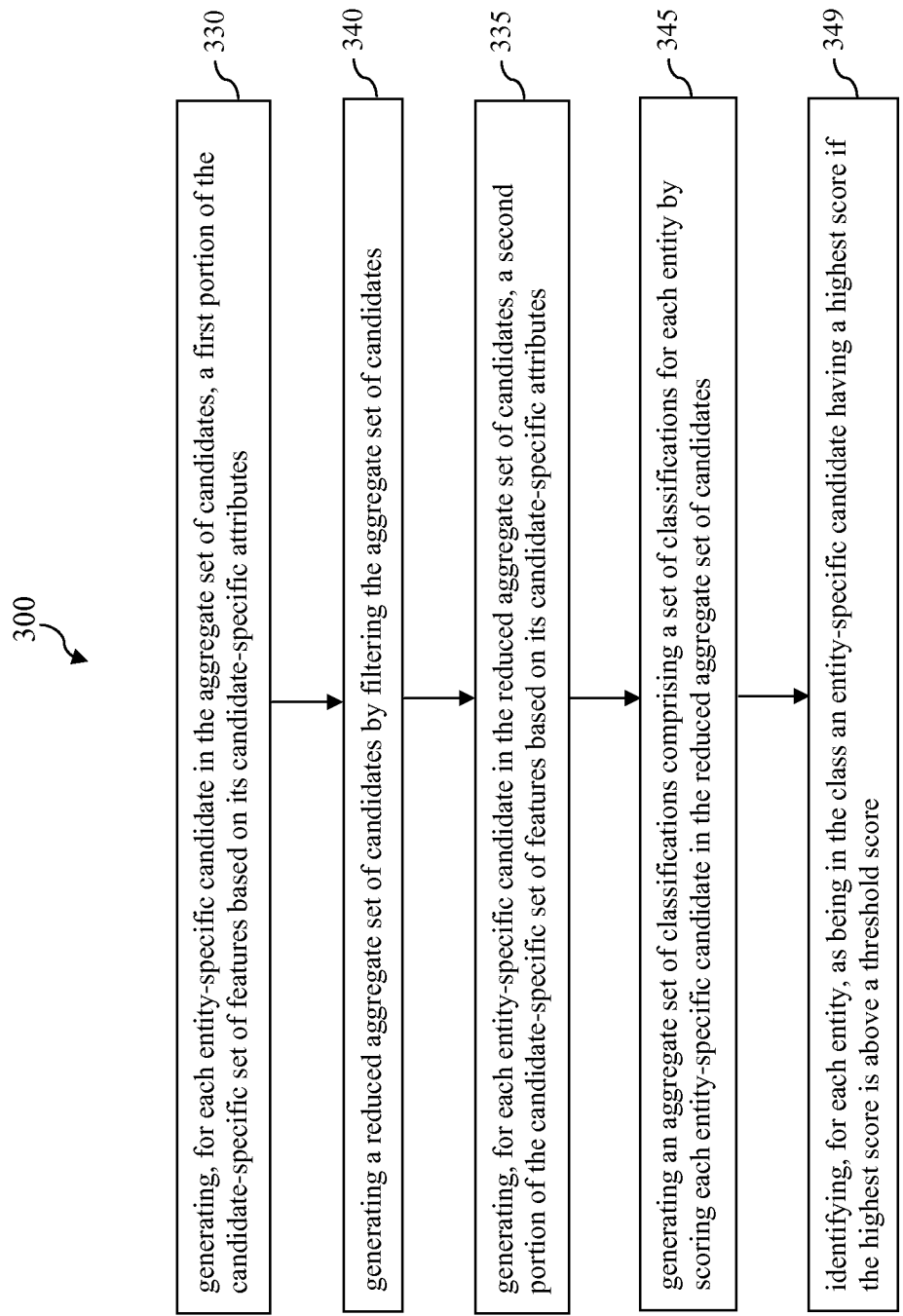
FIG. 3 is a flowchart of a method for generating an aggregate set of entity specific classifications for an aggregate set of entity-specific candidate resources by splitting feature generation and classification in accordance with an embodiment of the present invention.
Figure 4:
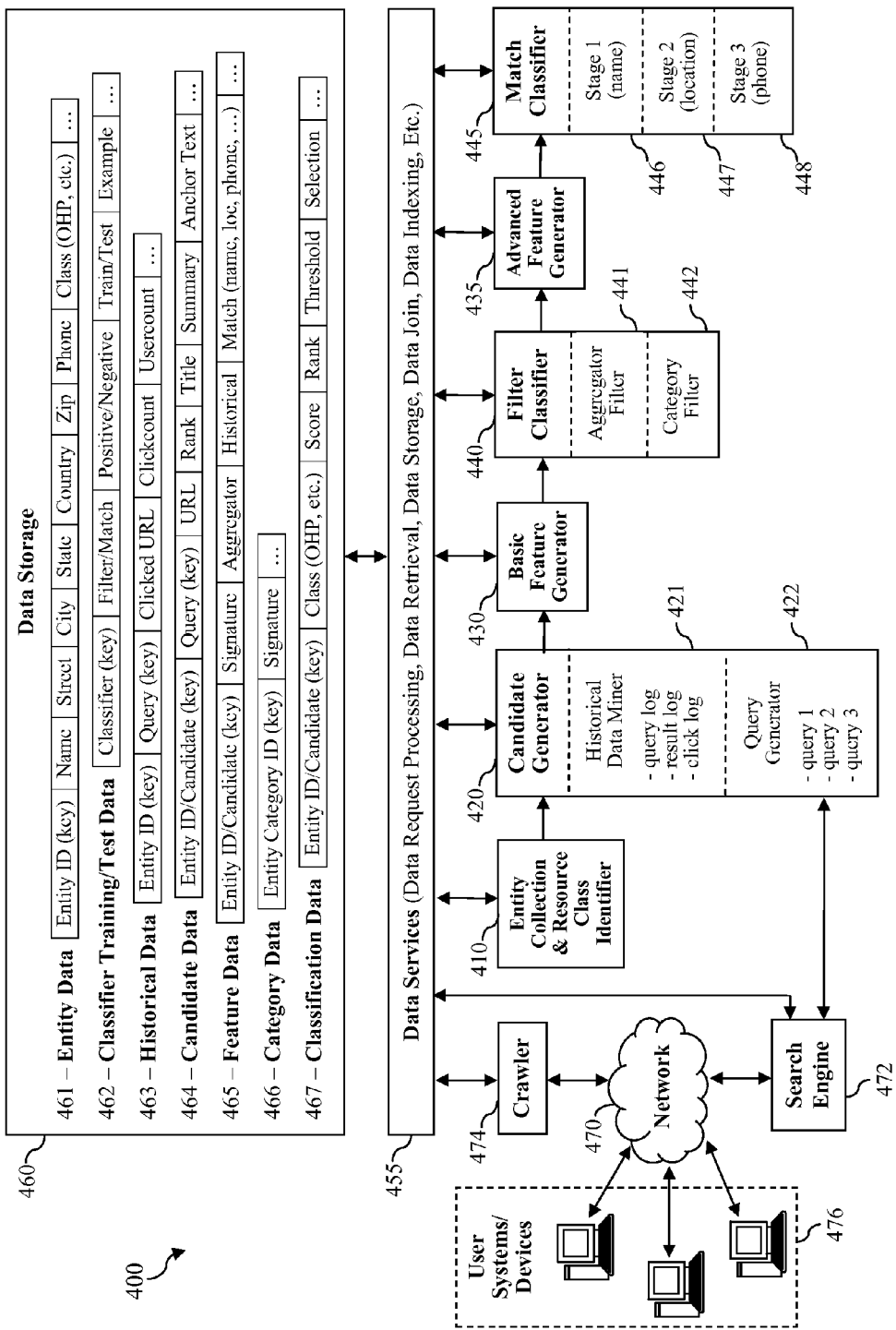
FIG. 4 is a block diagram of an exemplary system in which an embodiment of the present invention may be implemented.

Discussion of methodological embodiments in FIGS. 1-3 will be accompanied by references to elements in system 400 of FIG. 4, which is a block diagram of an exemplary system in which embodiments of the present invention may be implemented. Reference to elements in FIG. 4 provides an exemplary visual depiction of aspects of the methodological embodiments in FIGS. 1-3. Of course it should be understood that the visual depictions illustrated in FIG. 4 may not be the same for every embodiment.

B.1 Selecting Entities and a Class

Referring again to FIG. 1, step 110 comprises identifying an aggregate set of entities and a class of resources. Step 110 may be implemented, for example, by entity collection and resource class identifier 410. A collection or aggregate set of entities may be obtained from a variety of sources that maintain lists of entities, often accompanied by associated data referred to as entity data or entity attributes. For example, Yahoo! Local is one such source of entities and their attributes. In some embodiments, entities may be structured objects. As shown by entity data 461 in data storage 460, each entity may be accompanied by a structured set of associated data or attributes. Such data may include, for example, an entity ID or key, name, street address, city, state, country, zip code address, area code and telephone number, class attributes such as OHP, etc. Implementation of method 100 may, for example, serve to identify a resource as an OHP for an entity and, in some embodiments, store the resource's identifier (e.g. URL) as an OHP attribute value in entity data 461. Of course method 100 may be employed to engage in entity-specific finding of any class or relationship of resource(s) to specific entities.

A source of entities such as Yahoo! Local may or may not categorize entities. Categorized entities may, for example, comprise an entity category attribute as one method of sorting entities. If a list of entities is not categorized and the particular implementation of method 100 is designed to operate on category-specific entities within the same category, as opposed to uncategorized entities, then such a list of entities may need to be sorted or filtered into categories, domains or logical types of entities. Method 100 would proceed with the relevant aggregate set of category-specific entities pertinent to the resource class that method 100 is being employed to find. These steps are not illustrated in FIG. 1, but may be used in some embodiments where entities in a source set of entities are not in the same category and the classification algorithm is optimized for entities in the same category.

B.2 Generating Entity-Specific Candidates

Step 120 comprises generating an aggregate set of candidates for the aggregate set of entities by generating, for each entity in the aggregate set of entities, an entity-specific set of candidates based on each entity's entity-specific attributes, wherein each candidate comprises a resource having a resource identifier. Step 120, generating candidates, may be accomplished by, for example, candidate generator 420. In some embodiments, a resource having a resource identifier comprises a webpage at a particular URL. Generally though, a resource having a resource identifier comprises any identifiable resource.

One goal of generating an aggregate set of candidate resources is to prune away the vast majority of resources that have little to nothing to do with the desired entity-specific class of resources. It is an initial selection or filtering of resources. While targeted crawling, such as by crawler 474, may be one technique to accomplish this, the amount of crawling may be too extensive to be worthwhile. However, generically crawled resource data, such as by crawler 474, may be useful in embodiments of the invention. In some embodiments, utilizing current results provided by a search engine, existing historical data and/or generically crawled data may yield better results with less processing. In some embodiments, assumptions may be made about user feedback (e.g. user click actions) for search engine ranking of results for queries. These assumptions may be reflected in logic pertaining to candidate generation, feature generation and/or classification. For example, in some embodiments it may be assumed that, if an OHP exists for an entity, it is likely to be ranked high for entity queries and be frequently clicked on by search users.

Thus, some embodiments may leverage the expertise of search engines such as Yahoo! Search and/or the wisdom of search users to identify a set of entity-specific candidates for each entity in the set of entities. Candidates may be extracted by formulating one or more queries based on entity attributes such as a name query, name-city query, name-city-state query, name and street address query, name and full address query, etc. Unique attributes often, but not always, produce the most successful search results. The one or more queries may be applied to a search engine to yield current results and/or the queries may be used to search historical data such as search click logs showing what resources users clicked on in response to the same or similar queries as those generated for a particular entity.

In some embodiments, step 120, generating an aggregate set of candidates for the aggregate set of entities by generating, for each entity, an entity-specific set of candidates based on each entity's entity-specific attributes, may comprise, for example, part or all of candidate generating method 220 illustrated in FIG. 2. As previously noted, FIG. 2 is a flowchart of a method for generating an aggregate set of candidate resources for an aggregate set of entities in accordance with an embodiment of the present invention.

Candidate generating method 220 comprises, for each entity in the set of entities, step 223, generating at least one entity-specific representative query based on the entity's entity-specific attributes; either or both step 224, applying the at least one entity-specific representative query to a search engine and receiving the search results and step 225, receiving historical search results of a historical search engine query that is the same as or similar to the at least one entity-specific representative query; step 226, selecting resources from the search results and/or historical search results as candidates in the entity's entity-specific set of candidates and optional step 227, supplementing the aggregate set of candidates by link expansion analysis. The aggregate collection of entity-specific sets of candidates generated by applying candidate generating method 220 for each entity are referred to as an aggregate set or collection of candidates.

Step 223, generating representative queries, may be performed by, for example, query generator 422. One or more entity-specific representative queries may be generated for each entity using one or more combinations of a specific entity's attributes, such as those shown in entity data 461. For example, one or more queries may comprise name queries, name-city queries, name-city-state queries, name-street address queries, name-full address queries, etc. In accordance with step 224, these one or more representative queries per entity may be applied to a search engine, such as search engine 472, to yield current entity-specific search results. Alternatively, or in addition, in accordance with step 225, the one or more representative queries per entity may be used to find historical data, such as historical data 463, for queries that are the same or similar to queries generated in step 223. Step 225 may be accomplished, for example, by historical data miner 421. As illustrated by historical data 463, historical data may comprise, for example, queries, resources whose resource identifiers (e.g. URLs) were clicked, how many times they were clicked, how many unique users clicked on them, etc.

Step 226, selecting entity-specific resources as entity-specific candidates from the entity-specific search results and/or entity-specific historical search results may be accomplished by, for example, candidate generator 420. Resources selected as candidates may be stored, for example, in candidate data 464, perhaps with attributes useful for feature generation such as a query that led to its discovery, its rank in the search results, its resource identifier (e.g. URL), title, summary, anchor text leading to the candidate, etc. Candidate attributes may include data such as query and rank attributes indicating the manner in which the candidate was selected, such as from current search results, historical search results, click log results, etc. Post-classification analyses of such information may be helpful to modify classification algorithm(s) to improve precision and recall.

Entity-specific selection of resources as candidates for specific resources may be based, in part or in whole, on a ranking of resources in current and/or historic search results. For example, the first 50 highest ranked results may be selected as candidates. This manner of search result candidate generation may be defined as follows: Given an entity e and the set of entity queries $\{q^e_1, \ldots, q^e_m\}$, let $P^{Sk}(q)$ be the top-k search results obtained by issuing the query q against the search engine S, for each $p \epsilon P^{Sk}(q^e_1) \cup \ldots \cup P^{Sk}(q^e_m)$, generate an entity-candidate pair (e,p) as an initial search result candidate resource for e.

Selecting resources from the historical search results as candidates may also be based on historical click log results of the resources in historical search results. For example, the number of clicks by different users and/or the location of those users (e.g. as determined from their IP addresses or other information) may be taken into account in selecting candidates. This manner of click result candidate generation may be defined as follows: Given an entity e and the set of entity queries $\{q_1, \ldots, q^e_m\}$, let $P^{Sk}(q)$ be the top-k search results obtained by issuing the query q against the search engine S, for each $\epsilon\ P^{Sk}(q^e_1) \cup \ldots \cup P^{Sk}(q^e_m)$, generate an entity-candidate pair (e,p) as an initial click log candidate resource for e.

During candidate generation, resources may be added and pruned away by one or more techniques. Aggregator resources may be pruned away during candidate generation and/or during filtering or classification steps, which may be accomplished, for example, by aggregator filter 441 in filter classifier 440.

Another technique that may be used alone or in conjunction with other candidate generation techniques is link expansion analysis. As illustrated in FIG. 2, in some embodiments, candidate generating method 220 may comprise, alone or in combination with other resource/candidate generating techniques, step 227, supplementing the aggregate set of candidates by link expansion analysis. In one embodiment, link expansion analysis begins with a set of accurately classified resources, which are OHPs in this example. Link expansion analysis then finds all hub resources that inlink to the resources in the set of known OHPs. Further analysis of these hub resources often results in finding resources with lists of OHPs. Some of these candidate-rich resources may be aggregator resources. Resources in these lists may be extracted and added to entity-specific sets of candidate resources. Thus, while aggregator resources are generally not themselves candidates for an OHP class, they may be used to identify candidates.

When a plurality of resource generating techniques are used, there may be some duplication of resources. Although not shown as a step in FIG. 2, candidate generator 420 may, for example, eliminate duplicates while generating each entity-specific set of candidate resources in the aggregate collection of resources.

Following candidate generating step 120, each entity-specific set of candidates within the aggregate set of candidates may include a variety of resources, many of which are not the desired resource(s). For example, entity-specific sets of resources may comprise an official home page (OHP) for the entity and non-OHPs such as parent pages, aggregator pages, news pages, blog pages, review pages, pages pertaining to other entities having one or more attributes similar to those of the desired entity. Also, there may be some overlap of candidates among the many sets of entity-specific candidates.

B.3 Associating Candidates and Entities

Step 125, pairing or otherwise associating each entity with each candidate in the entity's entity-specific set of candidates for entity-specific processing of candidates, may be accomplished by, for example, candidate generator 420. Candidate generator 420 may store candidate data, for example, as shown in candidate data 464 where a key is generated for each candidate that is associated with an entity's unique ID. In other embodiments, association or pairing may comprise, for example, storing candidates in a table having columns identifying an entity and a column identifying a candidate. Thus each resource or entry (row) in the table associates or pairs entity-specific derived candidates with a specific entity. An entity identifier may be, for example, a Yahoo! Local entity identifier. A candidate identifier may comprise, for example, a candidate's resource identifier such as a URI or an identifier that may be used to obtain information about a resource stored in a database.

B.4 Generating Features

At the feature generation stage of entity-specific processing of candidates, each entity has an associated set of candidate resources/pages. Given an aggregate set of several hundred thousand entities, the number of entity-candidate pairs may be enormous. For each entity-candidate resource/page pair (e,p), feature generation will generate one or more sets of features or feature vectors x(e,p) for use during candidate classification. Given practical constraints such as available processing resources, which boils down to expense, implementation may be designed to minimize processing. Attempting to control expense may come with a tradeoff in terms of precision and recall. Suffice it to say that implementation may vary from one embodiment to the next depending on constraints.

Step 130, comprises generating, for each entity-specific candidate, a candidate-specific set of features based on its candidate-specific attributes. How and what features are generated may vary from one embodiment to the next depending on such variables as the classifier, processing constraints, precision and recall constraints, etc. In some embodiments, feature generation may be split into two or more feature generators. In other embodiments, feature generation may not be split. One embodiment of step 130, generating features, is illustrated in FIG. 3.

FIG. 3 is a flowchart of a method for generating an aggregate set of entity specific classifications for an aggregate set of entity-specific candidate resources by splitting feature generation and classification in accordance with an embodiment of the present invention. As illustrated in FIG. 3, step 130 may be split into step 330, generating, for each entity-specific candidate in the aggregate set of candidates, a first portion of the candidate-specific set of features based on its candidate-specific attributes, and step 335, generating, for each entity-specific candidate in a reduced aggregate set of candidates, a second portion of the candidate-specific set of features based on its candidate-specific attributes. In some embodiments, step 330, generating a first portion of features, may be implemented, for example, by basic feature generator 430 and step 335, generating a second portion of features, may be implemented by advanced feature generator 435. A filter classifier 440 interposed between basic and advanced feature generators 430, 435, may mean that basic feature generator 430 generates basic features for all candidates in the aggregate set of candidates while advanced feature generator 435 generates advanced features only for candidates in a reduced aggregate set of candidates output by filter classifier 440. Such split feature generation may avoid wasting valuable processing time generating features for candidates that don't even properly fall within the category of entities or otherwise lack basic features.

Candidate features may be based on or developed from candidate attributes, which broadly includes candidate data as well as historical and/or statistical data pertaining to candidates. As illustrated, at least in part, by candidate data 464, candidate data may comprise, for example, content such as anchor text, title, headings, the candidate's resource identifier, where the content and resource identifier may be tokenized or mined for content to extract particular attributes. Historical and/or statistical data pertaining to a candidate may comprise, for example, user behavior towards the candidate, candidate ranking in entity queries, the number of entities for which the candidate is in the top k queries, the number of entities for which the candidate's domain or host appears in the top k search results, ranking of the candidate in search results after removing aggregator domains, user selection data for the candidate when searching for its associated entity, the number of inlinks to the candidate, the number of domains inlinking to the candidate, anchor text leading to the candidate.

Some candidate attributes may be used directly as features while other features may be generated using candidate attributes. For example, candidate attributes may be used to generate candidate features by using them in a comparison, where the result of the comparison may become a candidate feature. For example, candidate attributes may be compared to entity attributes and category attributes. In some embodiments, step 130, generating features, may comprise, for example, generating category-candidate specific features and entity-candidate specific features determined, respectively, by determining similarities between candidate and category attributes and between candidate and entity attributes.

Category attributes used to generate or to compare to candidate features may comprise, for example, attributes or terms most common to candidate resources generated for the category of entities. These terms may be combined to form a signature for the category. Category attributes will be used to eliminate resources that may have some, but not a sufficient number of terms, such as a news page featuring an article about an entity school within a category schools. Candidate attributes may also comprise an average or merger of entity attributes and/or candidate attributes. For example, as illustrated in category data 466, a signature may be generated for a category of entities or the candidates generated for the entities, where the signature reflects the most common attributes of entities within the category or candidates generated for the entities.

Features may be categorical, ordinal, continuous, etc. As illustrated, at least in part by feature data 465, features may be categorized, for example, as statistical, historical (e.g. ranking, click), search results, aggregator, type (category), content, location, matching, etc. In some embodiments, basic features may comprise features that require less processing time to generate relative to processing time necessary to generate advanced features. Some or all basic candidate features may be generated independent of entity and candidate content. These features may already be stored in a historical database and simply need to be retrieved and organized for the candidates under consideration. For example, basic feature generator 430 may generate basic features for each candidate resource.

Statistical, historical and search features may overlap to some degree. Search data may be both statistical and historical, such as when it is stored in a historical database for prior queries and search results. For example, some statistical features may include the number of inlinks (inlinkcnt) and domains linking to a candidate (rawdomaincnt), and features indicating the importance of a candidate (e.g., PageRank or Yahoo linkflux for URLs). Search features may include, for example, pos(p,q) indicating the ranking of candidate resource p in current and/or historical search results for queries q based on entity attributes. Another feature may be cnt(p), indicating the number of entities for which candidate resource p appears in the top k search results. Among other uses, these features may be used to filter out candidates that appear in the search results for multiple entities on the theory that such candidates are unlikely to be an OHP for a particular entity and more likely to be aggregator-type resources. However, it may require analysis of more features because, for example, school district resources may appear in a relatively large number of search results for that school district's entity schools. Aggregator-type resources such as Yelp, citysearch.com, greatschools.net tend to be optimized for search engines so that they appear very often in search results and help push OHP results off the top k results.

Aggregator-type pages may be domain-specific, focusing on one domain such as education, or may span multiple domains. Aggregator domains, as opposed to particular resources, may be determined independently, perhaps in advance of candidate generation. A study of aggregator-type domains may yield some indications about what features to look for in candidates. Of course the features may vary from one category of entities to the next. One aggregator-type domain feature may comprise, for example, cnt_dom(p), which indicates the number of entities for which the domain (i.e. host) of candidate page p appears in the top search results. Another aggregator-type feature may comprise pos_agg(p,q), indicating the position of candidate page p for a query q after removing the top aggregator domains from the search results.

Returning to historical, statistical features, such as those pertaining to clicklog history, a candidate that is often clicked on by users searching for an entity may be a good indicator that a candidate is an OHP for the entity. While it may vary from one class to the next, it may be observed that click-through rates are higher for candidate resources that are OHPs than they are for non-OHP resources. One feature may be user_count(p,e), indicating the distinct number of users who clicked on resource/page p while searching for entity e. Another feature may be click_count(p,e), indicating the number of clicks. Another feature may be percentage(p,e), indicating the percentage of clicks on resource/page p among all clicks on all pages returned by searches for entity e. Another feature may be derivation, indicating the magnitude of difference between the number of clicks on page p and the average number of clicks on a page returned by searches for entity e.

While the foregoing features are generated independent of entity attributes and candidate content, generating features by comparing the similarities between or matching entity attributes and candidate attributes is a reliable technique to rank and identify candidates for the class under consideration. Generating these comparative features may consume more processing time, which is why in some embodiments they may be suited for generation only on candidate resources remaining after filtering out candidates having low probabilities of being in the desired class. For example, advanced feature generator 435 may generate features on a reduced set of candidate resources generated by filter classifier 440 using basic features generated by basic feature generator 430. Some or all advanced features may comprise matching features.

Matching features may comprise an indication of how closely candidate attributes or features, such as a candidate's resource identifier string, title, headings, content, anchor text leading to the candidate and user behavior indicators, match category and entity attributes. Matching features may comprise several subcategories such as name match, phone match and location match. These match features use the textual description of each entity, e.g. attributes in entity data 461, textual sources relating to candidates, e.g., attributes in candidate data 464 such as URL string, resource/page title, headings, content and anchor text leading to candidate resources/webpages. However, other candidate attributes and/or features may be used to generate match features, such as user behavior indicators from clicklogs. Attributes and features may be used and combined with others in basic and advanced feature generation.

A name match feature may, in some embodiments, comprise tokenizing the entity name into unigrams and computing its similarity with: (a) a candidate resource's entire URL string, (b) the host name of the URL, (c) the title and header tokens on the candidate resource/page, and (d) the anchor text leading to the candidate resource. In some embodiments, the similarity score is computed using a term frequency-inverse document frequency (tf-idf) cosine similarity computed between an entity name and the foregoing candidate resource attributes. For the anchor text, a similarity score $s_i$ is computed between the title and every anchor text line $a_i$ (from in-link resource i). The final score is computed as $\Sigma_i\, s_i w_i$, where $w_i$ is inversely proportional to the number of in-links to candidate page c that come from the same host as inlink resource i, which ensures that links appearing on all pages in a website (e.g. in the template itself) are not considered as independent sources of anchor text.

A location or geographic match feature may, in some embodiments, comprise identifying, for the candidate page of a given entity, whether (or the number of times) the street name, city and state associated with the entity appear in the candidate's: (a) entire URL, (b) host name of the URL, (c) title and header tokens, (d) page content, and (e) anchor text. These features are particularly useful when candidate pages focus on a single place, which many OHPs do. A geoparsing service such as Yahoo! Placemaker may be utilized along with a click profiling algorithm defined herein to compute a location profile for a candidate page. The location profile may characterized as a probability distribution over locations mentioned on the candidate page $P_p(\mathrm{loc})$), where loc is the city/state associated with the entity.

Yahoo! Placemaker may be used to identify all locations in the textual content of a candidate page. A click profiling algorithm may be used to compile a candidate page's location profile based on where the location of users who clicked on the candidate page. This location profile is computed by converting each user IP address to a location, e.g., by using an Internet locality application programming interface (API). Location information may also be extracted from resource identifiers (e.g. URLs) by country codes such as .us, .be, .de, etc. Location may also be gleaned from area codes in phone numbers within candidate resources. A probability distribution is then computed over the set of distinct locations based on the frequency of a location, the confidence with which it was extracted, and/or the number of distinct users. The final feature for the entity candidate pair is $P_p(loc)$.

Once features are generated for each candidate, they may be selectively combined into one or more feature vectors in different ways, e.g., linearly, non-linearly, to produce the most effective results during classification. Thus, feature vectors may be dependent upon the design of one or more classifiers. For example, in one embodiment, optional filter classification may seek to eliminate less relevant candidates, which may be, for example: (a) candidates whose signature doesn't satisfactorily match a category signature; (b) candidates that have too many similarities to aggregator resources such as yelp.com, citysearch.com, greatschools.net, publicschoolreview.com and bayareaschools.net; and/or (c) candidates having attributes indicating they are not in the proper location for the classification of the specific entity for which they are a candidate. Accordingly, prior to such filtering, it may be useful to generate a feature vector that combines and potentially weights only those features relevant to the filtering classification. Different feature vectors may be generated for candidates that survive filtering. Such feature vectors may be based on the design of a match classifier.

B.5 Classifying Candidates

At the classification stage of entity-specific processing of candidates, each entity has an associated set of candidate resources/pages where each entity-candidate pair has a set of features formed into one or more feature vectors. Candidates are classified according to their feature vector(s). Each entity-candidate resource/page pair (e,p) has one or more feature vectors x(e,p). The general class finding problem for candidate resource/page p for entity e can be cast as a binary classification y where: $y(e,p)=1$ if p is in the class and $-1$ if p is not in the class. Given practical constraints such as available processing resources, which boils down to expense, implementation may be designed to minimize processing. Attempting to control expense may come with a tradeoff in terms of precision and recall. Suffice it to say that implementation may vary from one embodiment to the next depending on constraints.

Entity-specific classification predicts whether each entity-specific candidate is in or out of a class relative to a specific entity. A classifier implements logic that effectively defines a class, or at least a portion of a class. Each of one or more classifiers may comprise an algorithm such as a machine learning algorithm. Some embodiments may use, for example, a gradient boosted decision tree (GBDT), a neural net or kernel based support vector machine (SVM) or other machine learning algorithm. A GBDT algorithm may be well-suited to a set of candidate features of varied types (e.g. categorical, ordinal, continuous). GBDT algorithms are invariant to order preserving transformations of variables, which means there is no need to modify or normalize features. GBDT can naturally quantify the importance of feature variables. GBDT is able to handle missing feature values. Performance may be improved by tuning GBDT parameters, such as the number of trees used in boosting, the size of each tree and the shrinkage factor.

Each classifier may comprise different types of supervised, semi-supervised and unsupervised machine learning algorithms. Each classifier may be trained and tested using training/test data 462. The type of training and test data, e.g., positive and/or negative examples, may depend on the type of algorithm deployed by a classifier. For example, a classifier may comprise a supervised machine learning algorithm trained on a partial set of entity-specific classifications. In some embodiments, a training set may comprise several hundred known classifications of candidate-resources to train an algorithm to classify tens of millions of candidate resources for several hundred thousand entities.

In some embodiments, training data may be generated by having human editors confirm entity-specific resources in the class for a random sample of entities. Test data may be determined in the same way. Test data may be used to evaluate algorithm precision. Analyses of test results may lead to improvements in classifier algorithms. Resources in the class are labeled positive while resources not in the class are labeled negative. It is possible for each entity to have more than one resource in a class (e.g. OHP). However, if there are multiples due to URL canonicalization, redirection or page duplication, they may be redundant. A database of webpage information, such as Yahoo! WebMap, may be queried to resolve redundancy issues. Incidentally, a search engine may also search indexed webpage information.

Classification may be split into two or more classifiers. In addition to splitting a classifier, one or more classifiers may also comprise multiple stages. A multi-stage classifier may comprise multiple stages of specialized classifiers focusing on, for example, a particular subtopic or purpose of classification such as location, type and name classification relative to a specific entity followed by aggregation of these staged classifiers for an overall filtering or match classification of a candidate relative to an entity. Staged classification may permit greater reusability of portions of or all of a classifier for different classes. As between different classes, features may be weighted differently and aggregate results may be assembled and processed differently to classify candidates for different classes relative to specific entities.

In some embodiments, classifiers may simultaneously or serially score/rank candidate resources for more than one class such as OHP, school district page, parent-teacher association (PTA) page, alumni page, etc. In some embodiments, the ability to simultaneously classify resources for a plurality of classes may be limited to related classes where the same or similar features are pertinent to classification. In some embodiments, the same classifier may be used for different classes by adjusting feature weights for different classes.

Classifiers may utilize constraints where desirable, for example where a candidate should only be classified as being in a class for no more than one entity. Thresholds may be set such that none or more candidates may be classified as being in the class depending on whether they are above a threshold score. Such thresholds may control both precision and recall. The level of precision permitted under processing constraints or desired for a particular application may vary from one embodiment to the next. For example, if the purpose is to update the attributes of entities such as those on Yahoo! Local then a high level of precision may be appropriate. In comparison, if the purpose is to add metadata to an OHP webpage to optimize it to search engines in order to boost its ranking in search results then a lower level of precision may be appropriate.

Step 140 comprises generating an aggregate set of classifications for the aggregate set of candidates by generating, for each entity-specific candidate, an entity-specific classification based on its candidate-specific set of features, wherein candidates are classified as being one of in and out of a class. A class may comprise an official home page or other relationship to an entity such as a fan, review or aggregator resource relative to the entity. When, how and what features are used to classify candidates may vary from one embodiment to the next depending on the class, available features, processing constraints, precision and recall constraints, etc.

Embodiments, i.e. implementations of, step 140 may comprise one or more classifiers. Just as feature generation may be split, in some embodiments, classification may be split into two or more classifiers. For example, a classifier may comprise filter and match classifiers. Since both filtering and classifying seek to rule candidates in or out of a class for an entity, they may be referred to as filter classifiers and match classifiers. Some features, such as basic features, may be used during filter classification to determine whether candidates should be eliminated from consideration relative to a category of entities or a specific entity while other features, such as advanced features, may be used during match classification to rank the most pertinent candidates to indicate a relative likelihood that they are in or out of the class (e.g. OHP class). One split-classifier embodiment of step 140, classifying candidates, is illustrated in FIG. 3.

FIG. 3 is a flowchart of a method for generating an aggregate set of entity specific classifications for an aggregate set of entity-specific candidate resources by splitting feature generation and classification in accordance with an embodiment of the present invention. As illustrated in FIG. 3, step 140 may be split into step 340, generating a reduced aggregate set of candidates by filtering the aggregate set of candidates, and step 345, generating an aggregate set of classifications comprising a set of classifications for each entity by scoring each entity-specific candidate in the reduced aggregate set of candidates. In the split feature generation and split classification embodiment presented in FIG. 3, relatively inexpensive or basic features are first generated and used for filter classification, to reduce the number of candidates, prior to generating and using relatively expensive or advanced features for a final, match classification only for the reduced number of candidates.

In some embodiments, step 340, filtering candidates, may be implemented, for example, by filter classifier 440 and step 345, classifying candidates, may be implemented by match classifier 445. In this embodiment, filter classifier 440 operates on at least one of the basic features of all candidates in the aggregate set of candidates while match classifier 445 operates on at least one advanced feature, and perhaps at least one basic feature, of candidates in a reduced aggregate set of candidates that were not filtered out by filter classifier 440. Such split feature generation and classification may avoid wasting valuable processing time generating advanced features for candidates that don't even properly fall within the category of entities or otherwise lack basic features.

Step 340, filtering candidates, generates a reduced aggregate set of candidates by reducing the number of candidates in some or all entity-specific sets of candidates. In step 340, filtering may utilize a threshold, which may be adjustable. A threshold may be used, for example, to control the level of filtering (e.g. order of magnitude reduction) of candidates to control the size of the reduced aggregate set of candidates. While filtering is designed to eliminate less relevant candidates, in some embodiments it may unintentionally eliminate some relevant candidates, thereby reducing recall.

Step 340, filtering candidates, may comprise, for example, generating an entity-specific score for each entity-specific candidate in the aggregate set of candidates based on at least one basic feature and, identifying candidates with scores sufficiently indicating they may be in the class under consideration for each specific entity. Candidate scores are effectively an entity-specific ranking of candidates from low to high scores indicating a relative or fixed likelihood or probability that candidates are in the class under consideration. From these scores, none or more candidates may be selected or identified as being in the class under consideration. A threshold may be used to specify a minimum score candidates must have in order to avoid being filtered out. The threshold may be adjustable. The threshold may be adjusted to control the level of filtering (e.g. order of magnitude reduction) of candidates.

Step 345, classifying candidates, may comprise, for example, generating an entity-specific score for each entity-specific candidate in the reduced aggregate set of candidates based on at least one advanced feature, and perhaps at least one basic feature, and identifying none or more of the scored candidates as being in the class under consideration for each specific entity. Candidate scores are effectively an entity-specific ranking of candidates from low to high scores indicating a relative or fixed likelihood or probability that candidates are in the class under consideration, e.g., indicating likelihood that candidates are OHPs for a specific entity.

From these scores, none or more candidates may be selected or identified as being in the class under consideration. In the embodiment shown in FIG. 3, step 349 comprises identifying, for each entity, as being in the class an entity-specific candidate having a highest score if the highest score is above a threshold score. In some embodiments, an entity-specific candidate having a high score/high rank may be selected as being in the class. In other embodiments such as FIG. 3 step 349, classifiers may utilize a threshold (which may be adjustable) to set a minimum score for candidates to be identified as being in or out of a class. Using such thresholds may increase precision in some embodiments while also indicating entities for which no matching resource was found.

Classification data generated during implementations of step 140 may be stored, for example, as classification data 467. Entries for classification data 467 may, for example, indicate the score, rank, threshold score and whether a particular candidate is identified or selected as being in a particular class for a particular entity. The aggregate collection of entity-specific classifications of candidates is referred to as an aggregate set or collection of classifications. Classification data 467 may be made available to search engines such as localized search engine Yahoo! Local and general search engine Yahoo! Search. In some embodiments, search engines may make final decisions whether and how to use and display such information.

B.6 Using Classification Data

One use for classification data is recited in step 150, assigning, for each entity for which a candidate was classified as being in the class, the candidate's resource identifier to the entity's entity-specific attributes. Candidates identified as being in a class relative to a specific entity, or candidate data such as candidate resource identifiers, may become part of the attributes for that specific entity. For example, for each entity for which a candidate was classified as being in the class, the candidate's resource identifier may be assigned to the entity's entity-specific attributes. As one example, Yahoo! Local may receive an aggregate set of classifications and decide whether a candidate's score is sufficiently high to warrant adding the candidate's resource identifier as an attribute value of an entity. For example, a candidate's resource identifier may be entered as the value for an official home page attribute of an entity. This is shown, for example, in entity data 461. Further, classification data may be stored in indexed search engine data accessible to search engine 472.

In other embodiments, classification data 467 may be used to modify classified resources. For example, a resource's metadata can be modified to reflect one or more entity-specific classifications. Such information may be picked up by crawlers such as crawler 474 and stored in data storage 460 for indexing and access by search engine 472.

Regardless where classification data 467 is stored, entity-specific finding and resulting classification data 467 offers numerous advantages. Automated entity-specific identification and classification of resources may be leveraged to identify what specific entity a resource pertains to and the relationship of the resource to the entity. Entity-specific classification of resources may be leveraged, for example, in general and localized search results, e.g., Yahoo! Search and Yahoo! Local. Entity-specific classifications of resources may be used to identify the status of a particular resource relative to a specific entity. For example, Yahoo! Local may display entity attributes including the URL of its OHP. Entity-specific classifications may also be used to highlight pertinent resources that may not otherwise be highlighted due to, for example, a lack of search engine optimization. For example, in response to searches involving entity attributes, Yahoo! Search may access and provide, rank and/or highlight classification data 467 or other classification data stored elsewhere, such as Yahoo! WebMap, for the entity's OHP.

C. Exemplary System

FIG. 4 is a block diagram of an exemplary system in which an embodiment of the present invention may be implemented. FIG. 4 illustrates another embodiment of a system for automated large-scale entity-specific identification and classification of a collection of sets of entity-specific candidate resources for a collection of entities. Since FIG. 4 was largely discussed in concert with discussion of embodiments illustrated in FIGS. 1-3, it should be readily apparent that the foregoing discussion of functionality of exemplary method embodiments applies equally well to a discussion of functionality of exemplary system embodiments such as the one depicted in FIG. 4. Functionality previously described may be translated into components and/or subcomponents in system embodiments. Accordingly, for the sake of brevity, the foregoing discussion of functionality will not be repeated. However, each of the components will be briefly discussed.

In the embodiment illustrated in FIG. 4, automated large-scale entity-specific identification and classification system 400 comprises entity collection and resource class identifier (identifier) 410, candidate generator 420, basic feature generator 430, filter classifier 440, advanced feature generator 435, match classifier 445, data services 455, data storage 460, network 470, search engine 472, crawler 474 and user systems/devices 476. System 400, perhaps exclusive of network 470, search engine 472, crawler 474 and user systems/devices 476, may be implemented on a plurality of computing machines, including a grid computing system comprising tens of thousands of computing machines.

For clarity in FIG. 4, data services 455 is presented as an amalgam of many types of data services that may be provided to one or more of the other components. Similarly, for clarity in FIG. 4, data storage 460 is presented as an amalgam of many types of data that may be stored, accessed and manipulated by one or more of the other components. The etc. and . . . at the end of data services 455 and each data item 461-467 means that each data item is merely an example and may contain more or less attributes/values. Indeed, the data may be stored, accessed and manipulated in any manner or combination. Data storage 460 and data services 455 may be representative of all services and all data involved in the functionality of the other components. Data storage 460 may comprise data storage for a broad-based data storage system, such as Yahoo! WebMap, which stores all information gathered by crawler 474 and search engine 472 from user/system devices 476, perhaps among other sources, through network 470. Network 470 may comprise any network, including the Internet. Such information may be indexed and accessed through a myriad of data services 455.

In one embodiment, a system may comprise, for example, (1) a candidate generator 420 configured to generate a collection of candidates for a collection of entities by generating, for each entity in the collection of entities, an entity-specific set of candidates based on each entity's entity-specific attributes; (2) a feature generator (430 and/or 435) configured to generate, for each candidate in each entity-specific set of candidates, a candidate-specific set of features based on each candidate's candidate-specific attributes; and (3) a classifier (445 and optionally 440) configured to generate a collection of classifications for the collection of candidates by generating, for each candidate in each entity-specific set of candidates, an entity-specific classification based on the candidate-specific set of features, wherein candidates are classified as being one of in and out of a class. As previously discussed, entity collection and resource class identifier 410, may be an optional component depending on the source of entities A candidate generator 420 is configured to generate a collection of candidates for a collection of entities by generating, for each entity in the collection of entities, an entity-specific set of candidates based on each entity's entity-specific attributes. In some embodiments, a candidate generator 420 may comprise or interact with a query generator component 422 that generates queries (e.g. queries 1, 2, 3) based on entity attributes, a historical data miner component 421 that mines for candidates based on historical data 463 such as query, result and click logs, an entity source database component (e.g. data storage 460) such as Yahoo! Local that stores source entities, an entity category selector or filter component (e.g. Identifier 410) that categorizes entities into categories and/or selects a category of entities, a search engine component 472 that processes queries and returns search results, a historical database component 463 that stores query logs, search result logs and/or click logs, and entity and candidate database components 461, 464 that store entities and their candidates.

A feature generator (430 and/or 435) is configured to generate, for each candidate in each entity-specific set of candidates, a candidate-specific set of features based on each candidate's candidate-specific attributes. In some embodiments, a feature generator (430 and/or 435) may comprise or interact with the candidate generator component 420, a historical database component 463 that stores query logs, search result logs and/or click logs, and entity and candidate database components 461, 464 that store entities and their candidates, a feature database component 465 that stores feature data, a filter classifier component 440 and a match classifier component 445.

In some embodiments, there may be a plurality of feature generators 430, 435. For example, the feature generator may comprise a basic feature generator 430 and an advanced feature generator 435. In some embodiments, one or more feature generators 430, 435 generate features at different times. For example, a basic feature generator 430 may generate basic features for each candidate before a filter component 440 filters out candidates, thereby creating a reduced set of candidates for which advanced features are generated. In some embodiments, the advanced feature generator 435 generates, for each candidate in the entity-specific set of candidates, features based on similarities between the entity-specific attributes and the candidate-specific attributes. A feature generator (430 and/or 435) may generate features for candidates, for example, directly from candidate attributes, independent of entity and category attributes, or by comparing candidate attributes to category attributes or entity attributes to determine similarities.

A classifier (445 and optionally 440) is configured to generate a collection of classifications for the collection of candidates by generating, for each candidate in each entity-specific set of candidates, an entity-specific classification based on the candidate-specific set of features, wherein candidates are classified as being one of in and out of a class. In some embodiments, a classifier (445 and optionally 440) may comprise or interact with the feature generator (430 and/or 435) and a database component storing features 465 and classifications 467. One or more of the classifiers (445 and optionally 440) may be staged or specialized. For example, filter classifier 440 may be staged, having aggregator and category filters 441, 442. Similarly, match classifier 445 may be staged, having name, location and phone classifiers 446, 447, 448. In some embodiments, one or more classifiers (445 and optionally 440) are configurable to generate variable precision classifications. A classifier (445 and optionally 440) may comprise a machine learning algorithm. In some embodiments, a classifier (445 and optionally 440) may be trained on positive and/or negative examples of resource classifications.

In some embodiments, there may be a plurality of classifiers, e.g., a filter classifier 440 and a match classifier 445. In some embodiments, a filter classifier 440 is configured to generate, for each entity-specific set of candidates, an entity-specific reduced set of candidates, wherein the match classifier 445 is configured to generate the collection of classifications for the collection of candidates by generating, for each candidate in each entity-specific reduced set of candidates, an entity-specific classification. In some embodiments, the filter classifier 440 comprises a category filter 442 configured to eliminate candidates based on dissimilarity between a category attribute and a basic feature of the candidates. In some embodiments, a match classifier 445 classifies candidates based on their advanced features.

D. Example Computer System Implementations

Embodiments of the invention and various functions, steps and components of it may be implemented in or by one or more and perhaps thousands of machines such as computers, devices or manufactures such as computer readable mediums comprising computer executable instructions executable by one or more computing machines or devices. In various embodiments, steps and components discussed herein may be added, eliminated, merged, split, rearranged, performed out of order, performed serially or in parallel by centralized or distributed processing.

As should be apparent from the foregoing discussion, in various embodiments the functionality described herein, or any portion or component thereof, may be implemented by hardware as well as a combination of software and hardware using any well-known processor-based computer system or device. One basic example of such a computer system 500 is depicted in FIG. 5.

Figure 5:
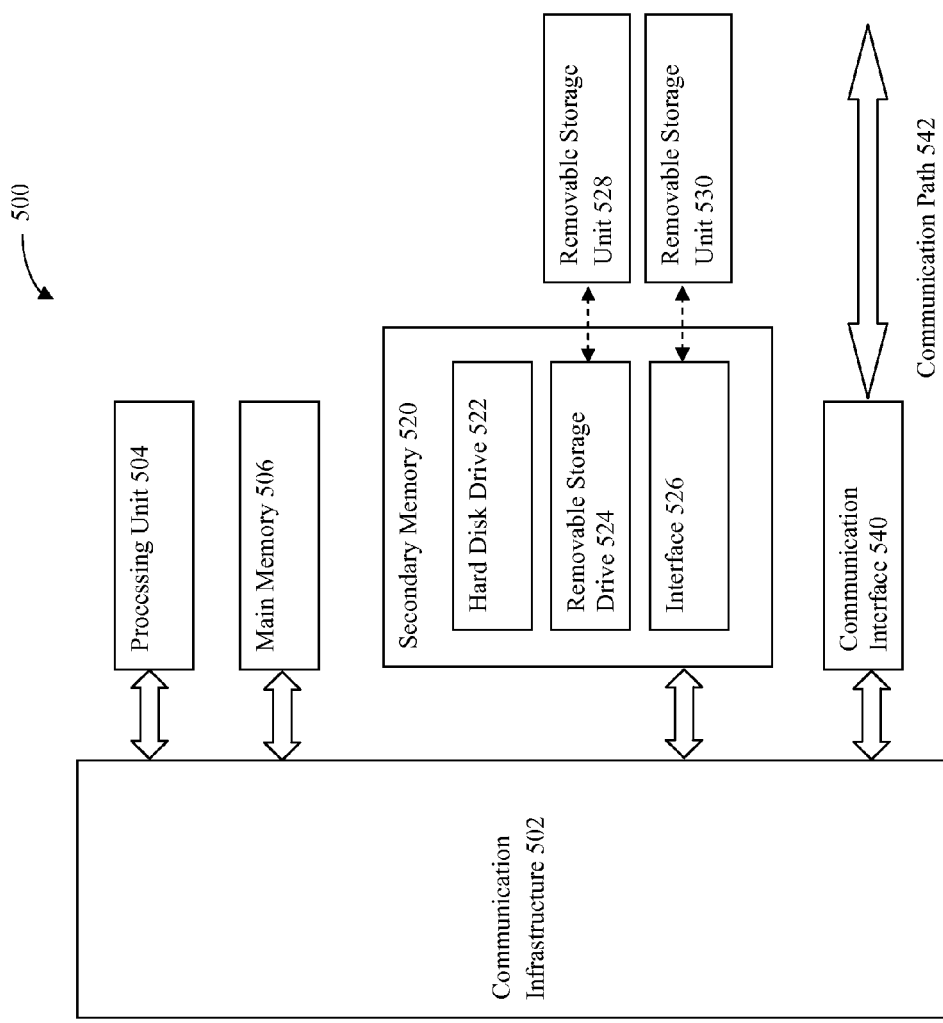
FIG. 5 is a block diagram of an exemplary computer system, one or more of which may be used to implement aspects of the present invention.

FIG. 5 is a block diagram of an exemplary computer system, one or more of which may be used to implement aspects of the present invention. As shown in FIG. 5, computer system 500 includes a processing unit 504 that includes one or more processors. Processor unit 504 is connected to a communication infrastructure 502, which may comprise, for example, a bus or a network.

Computer system 500 also includes a main memory 506, preferably random access memory (RAM), and may also include a secondary memory 520. Secondary memory 520 may include, for example, a hard disk drive 522, and/or a removable storage drive 524. Removable storage drive 524 may comprise a floppy disk drive, a magnetic tape drive, an optical disk drive, a flash memory, or the like. Removable storage drive 524 reads from and/or writes to a removable storage unit 528 in a well-known manner. Removable storage unit 528 may comprise a floppy disk, memory stick, magnetic tape, optical disk, or the like, which is read by and written to by removable storage drive 524. As will be appreciated by persons skilled in the relevant art(s), removable storage unit 528 includes a computer usable storage medium having stored therein computer software and/or data.

In alternative implementations, secondary memory 520 may include other similar means for allowing computer programs or other instructions to be loaded into computer system 500. Such means may include, for example, a removable storage unit 530 and an interface 526. Examples of such means may include a program cartridge and cartridge interface (such as that found in video game devices), a removable memory chip (such as an EPROM, or PROM) and associated socket, and other removable storage units 530 and interfaces 526 which allow software and data to be transferred from the removable storage unit 530 to computer system 500.

Computer system 500 may also include a communications interface 540. Communications interface 540 allows software and data to be transferred between computer system 500 and external devices. Examples of communications interface 540 may include a modem, a network interface (such as an Ethernet card), a communications port, a PCMCIA slot and card, or the like. Software and data transferred via communications interface 540 are in the form of signals which may be electronic, electromagnetic, optical, or other signals capable of being received by communications interface 540. These signals are provided to communications interface 540 via a communications path 542. Communications path 542 carries signals and may be implemented using wire or cable, fiber optics, a phone line, a cellular phone link, an RF link and other communications channels.

Computer program, readable or usable medium includes any kind of manufactured media including, but not limited to, removable storage unit 528, removable storage unit 530, a hard disk installed in hard disk drive 522, and signals received by communications interface 540. Computer program, readable or usable medium can also refer to memories, such as main memory 506 and secondary memory 520, which can be semiconductor devices (e.g., DRAMs, etc.). These computer program products are means for providing software to computer system 500.

Computer programs (also called computer control logic, programming logic, or logic) are stored in main memory 506 and/or secondary memory 520. Computer programs may also be received via communications interface 540. Such computer programs, when executed, enable the computer system 500 to implement features of the present invention as discussed herein. Accordingly, such computer programs represent controllers of the computer system 500. Where the invention is implemented using software, the software may be stored in a manufacture or computer program product such as one or more computer readable mediums and loaded into computer system 500 using, for example, removable storage drive 524, interface 526, or communications interface 540.

The invention is also directed to manufactures or computer program products comprising software stored on any computer useable or readable medium. Such software, when executed in one or more data processing devices, causes a data processing device(s) to operate as described herein. Embodiments of the present invention employ any computer useable or readable medium, known now or in the future. Examples of computer useable mediums include, but are not limited to, primary storage devices (e.g., any type of random access memory) and secondary storage devices (e.g., hard drives, floppy disks, CD ROMS, zip disks, tapes, magnetic storage devices, optical storage devices, MEMs, nanotechnology-based storage device, etc.).

E. Exemplary Manufacture

An embodiment of at least one manufacture is also described herein. Any number of embodiments may be implemented in at least one manufacture, such as one or more computer readable mediums, having computer executable instructions that, when executed by one or more computing machines, perform automated large-scale entity-specific identification and classification of a collection of sets of entity-specific candidate resources for a collection of entities.

The foregoing discussion of functionality of exemplary method and system embodiments applies equally well to a discussion of functionality of exemplary manufacture embodiments. Accordingly, for the sake of brevity, the foregoing discussion of functionality will not be repeated.

In one embodiment, one or more manufactures may have, for example, computer executable instructions that, when executed by one or more computing machines, perform the following steps: (1) accessing a collection of entities comprising entities having entity-specific attributes; (2) generating a collection of candidates for the collection of entities by generating, for each entity and its entity-specific attributes in the collection of entities, an entity-specific set of candidates based on the entity-specific attributes, wherein each candidate has candidate-specific attributes and wherein each candidate comprises a resource; (3) generating, for each candidate and its candidate-specific attributes in each entity-specific set of candidates, a candidate-specific set of features based on the candidate-specific attributes; and (4) generating a collection of classifications for the collection of candidates by generating, for each candidate and its candidate-specific set of features in each entity-specific set of candidate resources, an entity-specific classification based on the candidate-specific set of features, wherein candidates are classified as being one of in and out of a class.

F. Claim Interpretation

As used herein, a method is a statutory "process" having the broadest statutory meaning of "process" in 35 U.S.C. §101. As used herein, a computer, system, device, apparatus or computing machine is a statutory "machine" having the broadest statutory meaning of "machine" in 35 U.S.C. §101. As used herein, a manufacture or computer readable medium is a statutory "manufacture" having the broadest statutory meaning of "manufacture" in 35 U.S.C. §101. The claims are not intended to and shall not be interpreted to encompass non-statutory subject matter excluded by 35 U.S.C. §101.

There is no heart or gist of the invention. The invention comprises the whole of the claimed subject matter, including all steps and/or elements in each claim taken together as a whole. Any and all claims based on this application may properly be directed to less than all steps and elements disclosed herein.

F. Conclusion

While various embodiments of the present invention have been described above, it should be understood that they have been presented by way of example within a broader scope of invention, and without limitation. For example, although embodiments described herein discuss OHPs as a class for which resources may be classified, they may be classified for any class. Additionally, although embodiments of the present invention described above refer to resources as Web pages, persons skilled in the relevant art(s) will readily appreciate that the present invention may apply to any resource. Additionally, although embodiments of the present invention are described above in the context of the Internet and an Internet search engine, persons skilled in the relevant art(s) will appreciate that the present invention may be implemented in any type of network and network search engine.

It will be understood by those skilled in the relevant art(s) that various changes in form and details may be made to the embodiments described above without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method performed by at least one computing machine, the method comprising:
    generating an aggregate set of candidates for an aggregate set of entities by:
        generating at least one entity-specific representative query based, at least in part, on two or more entity-specific attributes for an entity in the aggregate set of entities,
        identifying one or more previously-submitted search queries similar to the at least one entity-specific representative query,
        determining a particular candidate for the entity based, at least in part, on one or more historical user selections of the particular candidate responsive to the one or more previously-submitted search queries for the entity, wherein the particular candidate comprises a resource;
    pairing or otherwise associating the entity with the particular candidate in the entity's entity-specific set of candidates for entity-specific processing of candidates;
    generating, for the particular candidate, a candidate-specific set of features based, at least in part, on candidate-specific attributes;
    generating an aggregate set of classifications for the aggregate set of candidates by generating, for the particular candidate, an entity-specific classification based, at least in part, on the candidate-specific set of features; and
    identifying the particular candidate as a homepage for the entity based, at least in part, on the entity-specific classification and the historical user selections, from a plurality of users, of the particular candidate.

2. The method of claim 1, further comprising:
    assigning, for the entity for which the particular candidate has been classified as being in a class, the candidate's resource identifier to the entity's two or more entity-specific attributes.

3. The method of claim 2, wherein the class comprises official home pages for specific entities.

4. The method of claim 1, wherein the generating an aggregate set of classifications comprises, for the entity, scoring the particular candidate and identifying as in the class an entity-specific candidate having a highest score in response to determining that the highest score is above a threshold score.

5. The method of claim 1, wherein the aggregate set of classifications is generated by a machine learning process.

6. The method of claim 5, wherein the machine learning process comprises a supervised machine learning process trained on a partial set of entity-specific classifications.

7. The method of claim 1, wherein the generating the aggregate set of classifications is performed by a multi-stage classifier.

8. The method of claim 1, wherein the aggregate set of entities comprises category-specific entities within the same category selected from a collection of entities.

9. The method of claim 8, wherein the candidate-specific set of features comprises a category-candidate specific feature and an entity-candidate specific feature determined, respectively, by determining similarities of at least one of a candidate's candidate-specific attributes to at least one category attribute and to at least one entity-specific attribute.

10. The method of claim 1, the method further comprising:
before generating the aggregate set of classifications, generating a reduced aggregate set of candidates by filtering the aggregate set of candidates and wherein the aggregate set of classifications is generated for the reduced aggregate set of candidates.

11. The method of claim 10, wherein a first portion of the candidate-specific set of features is generated before the filtering and a second portion of the candidate-specific set of features is generated after the filtering.

12. The method of claim 10, wherein filtering is performed by a machine learning process.

13. The method of claim 1, further comprising:
supplementing the aggregate set of candidates by link expansion.

14. The method of claim 1, further comprising:
removing aggregator resources from the aggregate set of candidates.

15. A system comprising: at least one computing device to:
generate a collection of candidates for a collection of entities;
generate at least one entity-specific representative query to be based, at least in part, on two or more entity-specific attributes for an entity in the aggregate set of entities;
identify one or more previously-submitted search queries to be similar to the at least one entity-specific representative query;
determine a particular candidate for the entity to be based, at least in part, on one or more historical user selections of the particular candidate responsive to the one or more previously-submitted search queries for the entity, wherein the particular candidate to comprise a resource;
generate, for the particular candidate in the entity-specific set of candidates, a candidate-specific set of features to be based, at least in part, on the candidate's candidate-specific attributes;
generate a collection of classifications for the collection of candidates;
generate, for the particular candidate in the entity-specific set of candidates, an entity-specific classification to be based, at least in part, on the candidate-specific set of features; and
identify the particular candidate as a homepage for the entity to be based, at least in part, on the entity-specific classification and the historical user selections, from a plurality of users, of the particular candidate.

16. The system of claim 15, further to:
generate, for the entity-specific set of candidates, an entity-specific reduced set of candidates;
generate the collection of classifications for the collection of candidates; and
generate, for the candidate in the entity-specific reduced set of candidates, an entity-specific classification.

17. The system of claim 16, and further: to generate advanced features for the candidate in the entity-specific reduced set of candidates.

18. The system of claim 17, wherein the collection of entities is to be category-specific and further to eliminate candidates to be based, at least in part, on dissimilarity between a category attribute and a basic feature of the candidates.

19. The system of claim 17, and further to generate, for the candidate in the entity-specific set of candidates, features to be based, at least in part, on similarities between the two or more entity-specific attributes and the candidate-specific attributes.

20. The system of claim 15, and further to: classify candidates as being either in or out of a class, the system further, for candidates to be classified as being in the class, to identify the attributes of the specific entity for which the candidates are to be classified.

21. The system of claim 15, and further to: generate variable precision classifications.

22. An article comprising: at least one non-transitory storage medium having computer executable instructions to:
access a collection of entities to comprise entities with entity-specific attributes;
generate a collection of candidates for a collection of entities and to:
generate at least one entity-specific representative query to be based, at least in part, on two or more entity-specific attributes for an entity in the aggregate set of entities,
identify one or more previously-submitted search queries to be similar to the at least one entity-specific representative query,
determine, for the entity to be based, at least in part, on one or more historical user selections of the particular candidate in response to the one or more previously-submitted search queries for the entity, wherein the particular candidate to comprise a resource;
generate, for the particular candidate and the candidate-specific attributes in the entity-specific set of candidates, a candidate-specific set of features to be based, at least in part, on the candidate-specific attributes;
generate a collection of classifications for the collection of candidates to be based, at least in part, on generation, for the candidate and the candidate-specific set of features in the entity-specific set of candidate resources, an entity-specific classification to be based, at least in part, on the candidate-specific set of features; and
identify the particular candidate as a homepage for the entity to be based, at least in part, on the entity-specific classification and the historical user selections, from a plurality of users, of the particular candidate.

23. The article of claim 22, wherein the instructions are further executable to:
filter the entity-specific set of candidates to generate an entity-specific reduced set of candidates, wherein the entity-specific classifications are to be generated for the particular candidate in the entity-specific reduced set of candidates.

24. The article of claim 23, further comprising executable instructions to generate advanced features for the candidate in the entity-specific reduced set of candidates.

25. The article of claim 24, wherein the collection of entities is to be category-specific and wherein the executable instructions are further to eliminate candidate resources to be based, at least in part, on dissimilarity between a category attribute and a basic feature of the candidates.

26. The article of claim 24, the executable instructions further to generate for the candidate in the entity-specific set of candidates, advanced features to be based, at least in part, on similarities between the candidate's candidate-specific attributes and entity-specific attributes of an entity to be associated.

27. The article of claim 22, wherein the classifications to indicate whether entity-specific candidates to comprise official home pages for specific entities.

28. The article of claim 22, wherein the instructions are further executable to generate the classifications in multiple stages.

* * * * *